United States Patent
Watanabe et al.

(10) Patent No.: US 10,079,533 B2
(45) Date of Patent: Sep. 18, 2018

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventors: Takashi Watanabe, Yokohama (JP); Hiroyuki Watanabe, Tokyo (JP); Shouchun Li, Huizhou (CN)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (CN); HUIZHOU DAYA BAY JSS OPTICAL TECHNOLOGY.CO., LTD., Huizhou (CN)

( * ) Notice: Subject to any disclaimer, the term of this patent is extended or adjusted under 35 U.S.C. 154(b) by 0 days.

(21) Appl. No.: 15/721,984

(22) Filed: Oct. 2, 2017

(65) Prior Publication Data

US 2018/0097435 A1    Apr. 5, 2018

(30) Foreign Application Priority Data

Oct. 3, 2016    (JP) .................. 2016-195819

(51) Int. Cl.
| | |
|---|---|
| *H04N 5/225* | (2006.01) |
| *H02K 41/035* | (2006.01) |
| *G02B 7/02* | (2006.01) |
| *G02B 7/09* | (2006.01) |
| *G02B 27/64* | (2006.01) |
| *G03B 3/10* | (2006.01) |
| *G03B 13/36* | (2006.01) |

(52) U.S. Cl.
CPC ......... *H02K 41/0356* (2013.01); *G02B 7/023* (2013.01); *G02B 7/09* (2013.01); *G02B 27/646* (2013.01); *G03B 3/10* (2013.01); *G02B 7/026* (2013.01); *G03B 13/36* (2013.01); *H04N 5/2257* (2013.01)

(58) Field of Classification Search
CPC .................. H04N 5/2257; H02K 41/0356
USPC ....................................................... 348/357
See application file for complete search history.

(56) References Cited

U.S. PATENT DOCUMENTS

2012/0147258 A1*  6/2012  Park .................. G02B 7/08
                                                 348/374

\* cited by examiner

*Primary Examiner* — Joel Fosselman
(74) *Attorney, Agent, or Firm* — Hemisphere Law, PLLC; Zhigang Ma

(57) ABSTRACT

A lens driving device capable of efficiently inhibiting garbage from falling to the side of a photosensitive sensor includes a lens support for retaining a lens, a fixed member, one or two spring members for connecting the lens support and the fixed member, and an electromagnetic driving assembly. The fixed member includes a substrate defining a circular through hole, a cylindrical dividing wall extending from an edge defining the circular through hole, several protruding parts protruding from the substrate outside the dividing wall, and concave parts formed between the protruding parts and the dividing wall. The lens support is provided with an end face capable of contacting a second front end face of the protruding parts and opposite to the concave parts, and a ring-shaped end surface arranged opposite to an end face of the dividing wall.

11 Claims, 14 Drawing Sheets

LENS DRIVING DEVICE

BACKGROUND OF THE INVENTION

1. Field of the Invention

The present invention relates to a lens driving device applied to, but not limited to, cameras of portable electronic devices.

2. Description of Related Art

In recent years, for cameras loaded in mobile telephones, people are devoted to the increase of pixel count and the improvement of high performance of zoom processing and macro-processing, thus, for loaded lens systems, people are devoted to the research of existing fixed-focus lenses and also devoted to the research of movable focus aspects. An existing driving device for a lens system with a movable focal point is mostly a lens driving device 50 with a voice coil motor as shown in FIG. 14.

In the lens driving device 50, lower springs 54 and upper springs 55 are used for connecting the supports 52 for retaining the lens 51 onto the fixed members 53, and electromagnetic driving assembly are formed by magnet 57 and magnet yokes 56 arranged opposite to coils 58 wound on the supports 52. In the electromagnetic driving assembly, current flows into the coils 58, so that the supports 52 obtain driving force (Lorentz force). Therefore, the lens 51 moves along the winding shaft direction of the coil 58, and can be focused on the illuminated face 63a of the photosensitive sensor 63.

As shown in FIG. 14B, the fixed member 53 is provided with a substrate 53a, a circular through hole 53b formed in the substrate 53 and facing the opening in the side of the photosensitive sensor 63, a dividing wall 61 and protruding parts 62. For example, the circular through hole 53b taking the optical axis of the lens 51 as the center shaft, the cylindrical dividing wall 61 extending vertically from the hole edge of the circular thorough hole 53b and the protruding parts 62 protruding from the substrate surface 53t of the substrate 53 and extending from the outer peripheral surface of the dividing wall 61 to the outer side of the circular through hole 53b in the diameter direction are formed in the center of the square plate-like substrate 53a. Three or more than three protruding parts 62 are arranged at equal intervals along the circumferential direction of the circular through hole 53b, for example, four protruding parts 62 are arranged at equal intervals of 90-degree center angle along the circumferential direction of the circular through hole 53b.

As shown in FIG. 14A, the support 52, on the end arranged opposite to the fixed member 53, is provided with a flange part 59 protruding towards the outer side in the diameter direction. On the inner side of the support 52, the lens 51 is installed in virtue of a fixed support 51a in the manner that the optical axis of the lens 51 is aligned to the center shaft of the support.

Moreover, the lens 51 is configured to be isolated from the circular through hole 53b formed in the fixed member 53 and the inner space of the cylindrical dividing wall 61, and is arranged opposite to the photosensitive sensor 63.

The existing lens driving device 50 is formed into the following structure, namely, the initial height in the lens moving direction is limited on the second front end faces 62b (upper surface in FIG. 14) of the protruding parts which are integrated with the cylindrical dividing wall 61 on the side of the fixed member 53 and are continuous along the side of the outer periphery, and the second front end faces 62b of the protruding parts 62 are in contact with the opposite surface on the side of the support 52.

In recent years, mobile equipment such as mobile phones are required to be of extremely high reliability, and the requirement for test conditions such as falling impact tests gets more server each year.

In such falling impact, the second front end face 62b of the protruding part 62 collides with the support 52 repeatedly, and thus the contact part between the second front end face 62b of the protruding part 62 and the support 52 is easily deformed or damaged. For example, the second front end face 62b of the protruding part 62 is abraded to generate the garbage such as abrasion powder, and after the garbage is adhered onto the cylindrical dividing wall 61, the problem that the garbage falls onto the photosensitive sensor 63 through the inner space of the dividing wall 61 appears.

Thus, in order to enable the garbage to be difficult to fall onto the photosensitive sensor 63, as shown in FIG. 14, the cylindrical dividing wall 61 higher than the protruding parts 62 is arranged on the inner side of the protruding parts 62, see JP 2008-304605 (publication date is Dec. 18, 2008) in detail.

However, even if the device is provided with the cylindrical dividing wall structure higher than the second front end faces of the protruding parts, the second front end faces of the protruding part are also connected with the outer peripheral surface of the dividing wall (continuously), so that the following problem may appear, for example, the garbage generated at the contact part between the second front end face of the protruding part and the support moves on the second front end face and the outer peripheral surface of the dividing wall, is possibly deposited on the dividing wall, is invaded into the inner side of the dividing wall, and finally falls to the side of the photosensitive sensor.

BRIEF SUMMARY OF THE INVENTION

Therefore, the present invention provides a lens driving device capable of efficiently inhibiting garbage from falling to the side of a photosensitive sensor.

The lens driving device includes: a lens support for retaining a lens, an end, close to an object to be shot, of the lens being defined as an inlet end, and the other end, far away from the object to be shot, of the lens being defined as an outlet end; a fixed member configured on one side of the outlet end of the lens and defining a circular through hole opposite to the outlet end of the lens such that a photosensitive sensor may be provided and being disposed oppositely the outlet end of the lens through the circular through hole; at least one spring member configured for connecting the lens support and the fixed member; and an electromagnetic driving assembly, including a coil winding around the lens support, and magnets and magnet yokes which are arranged opposite the coil with an interval; when current flowing into the coil, the lens retained on the lens support moving along an winding shaft direction of the coil and capable of focusing on the photosensitive sensor. The fixed member includes: a substrate, the circular through hole being formed in the substrate, and a diameter of the circular through hole being greater than or equal to an maximum caliber size of the lens; a cylindrical dividing wall extending from an edge defining the circular through holt towards the lens support; a plurality of protruding parts protruding from a substrate surface of the substrate on an outer peripheral side of the dividing wall towards the lens support; a surface, facing the lens support, of the plurality of protruding parts being defined as a second front end face; and a plurality of concave parts formed between the second front end faces of the plurality of protruding parts and an outer peripheral surface of the dividing wall. The lens support includes: an end face, opposite to the fixed member, contacting with the second front end faces of the plurality of protruding parts, and opposite to the plurality of concave parts; a cylindrical inner peripheral surface, extended from the end face, and arranged opposite to the outer peripheral surface of the dividing wall; and a ring-shaped end surface, extended from the cylindrical inner peripheral surface, and arranged opposite to an end face of the dividing wall. The substrate surface of the substrate is taken as reference, a height of the dividing wall is greater than a height between the second front end face of the protruding part and the substrate surface of the substrate. The plurality of protruding parts are arranged at intervals around the circular though hole, or the plurality of protruding parts are continuously arranged around the circular through hole.

The lens driving device is provided with a cylindrical dividing wall for limiting transverse movement of the lens and a second front end face of the protruding part for limiting the initial height in the lens moving direction at the part, connected with the dividing wall, of the concave part. Therefore, under the condition that the second front end face of the protruding part is in contact with the end face of the support, a certain interval is maintained between the end face of the dividing wall and the ring-shaped end surface of the support opposite to the end face of the dividing wall, so that the dividing wall end face of the fixed member in the lens moving direction cannot collide with one ring-shaped surface of the support. And then, under the condition that the impact is stressed along the lens moving direction, even if the second front end face of the protruding part is in contact with the end face of the support to generate the garbage from the contact part, the garbage falls to the concave part and is also difficult to reach the cylindrical dividing wall and adhere onto the dividing wall due to the concave part positioned between the second front end face of the protruding part and the cylindrical dividing wall and the cylindrical dividing wall higher than the second front end face of the protruding part, so that the lens driving device capable of effectively inhibiting the garbage from falling to the side of the photosensitive sensor can be obtained.

Preferably, an overlapping amount between the end face of the cylindrical dividing wall and the end face of the lens support in a lens moving direction when the end face of the lens support contacts with the second front end faces of the plurality of protruding parts is greater than or equal to a maximum movement amount of the lens support in the lens moving direction, and a width of the concave part along a diameter direction of the lens is greater than or equal to one half of the height between the second front end face of the protruding part and the substrate surface of the substrate.

Thus, the overlapping amount and the width of the concave part are such set that the garbage is difficult to reach onto the cylindrical dividing wall, so that the lens driving device capable of effectively inhibiting the garbage from falling onto the side of the photosensitive sensor can be obtained.

Preferably, the support is provided with the cylindrical dividing wall which extends from the end face, arranged opposite to the concave part, of the support and is positioned in the concave part.

Thus, the cylindrical dividing wall positioned in the concave part is arranged on one end of the support, even if under the condition that the camera is used in the state that the lens is downward, the garage can be prevented from moving towards the side of the photosensitive sensor through the cylindrical dividing wall and can be inhibited from falling onto the photosensitive sensor, so that the garbage can be prevented from being adhered to cause image defect.

In an embodiment, a circular ring-shaped groove is formed in the fixed member; the circular ring-shaped groove is formed concavely from the end face of the dividing wall to the side of the substrate and is provided with an inner peripheral surface of the dividing wall and the inner peripheral surface arranged on the back of the outer peripheral surface, and the support is provided with the cylindrical dividing wall inserted in the circular ring-shaped groove. Thus, a cylindrical wall body formed on the inner peripheral surface of the circular ring-shaped groove and a cylindrical wall body formed on the outer circumference of the circular ring-shaped groove are arranged on the fixed member on the overlapping part between the support and the fixed member.

The support is arranged on the cylindrical dividing wall and is formed in the shape of a mouth, the garbage generated inside the lens driving device can be inhibited from moving towards the inner side of the dividing wall, and the garbage can be inhibited form falling onto the photosensitive sensor, so that the garbage can be prevented from being adhered to cause image defect.

In an embodiment, the annular groove concave from the outer peripheral surface of the dividing wall to the side of the inner peripheral surface of the dividing wall is formed in the whole circumference of the outer peripheral surface of the cylindrical dividing wall arranged on the fixed member, the annular groove is formed in the whole circumference of the outer peripheral surface of the cylindrical dividing wall, the garbage possibly passing over the cylindrical dividing wall can be captured by the annular groove, and the garbage can be inhibited from falling onto the photosensitive sensor, so that the garbage can be prevented from being adhered to cause image defect.

In an embodiment, a plurality of annular grooves with different diameters using the center shaft of the dividing wall as the center are formed in the dividing wall, so that a plurality of outer peripheral surfaces are formed; a plurality of rings for being inserted in the annular grooves, a plurality of cylindrical inner peripheral surfaces arranged opposite to the outer peripheral surfaces with different diameters, and a plurality of ring-shaped end surfaces arranged opposite to the end face of the outer peripheral surfaces with different diameters are arranged on the end, arranged opposite to the fixed member, of the support.

Thus, in the overlapping part between the support and the fixed member, the opposite surfaces between the support and the fixed member are oppositely arranged in the shapes of steps, so that the garbage generated in the interior of the lens driving device can be inhibited from passing over the cylindrical dividing wall to fall onto the photosensitive sensor, and the garage can be prevented from being adhered to cause image defect.

In an embodiment, the lens driving device includes; a lens support for retaining a lens, an end, close to an object to be shot, of the lens being defined as an inlet end, and the other end, far away from the object to be shot, of the lens being defined as an outlet end; a fixed member configured on one side of the outlet end of the lens and defining a circular through hole opposite to the outlet end of the lens such that a photosensitive sensor may be provided and being disposed oppositely the outlet end of the lens through the circular through hole; at least one spring member configured for connecting the lens support and the fixed member; and an electromagnetic driving assembly, including a coil winding around the lens support, and magnets and magnet yokes which are arranged opposite the coil with an interval; when current flowing into the coil, the lens retained on the lens support moving along an winding shaft direction of the coil and capable of focusing on the photosensitive sensor. The fixed member includes: a substrate, the circular through hole being formed in the substrate, and a diameter of the circular through hole being greater than or equal to an maximum caliber size of the lens; a circular ring-shaped groove formed in the substrate around the circular through hole; and a plurality of protruding parts protruding from a substrate surface of the substrate on an outer peripheral side of the circular ring-shaped groove towards the lens support; a surface, facing the lens support, of the plurality of protruding parts being defined a the second front end face. An end part, arranged opposite to the fixed member, of the lens support includes: an outer peripheral end face, configured for contacting with the second front end faces of the plurality of protruding parts; a cylindrical side surface, extending from the outer peripheral end face towards the substrate; an inner peripheral end face, extending from the cylindrical side surface to be in contact with the substrate; and a cylindrical dividing wall, protruding from the inner peripheral end face towards the fixed member, and configured in the circular ring-shaped groove. The plurality of protruding parts are arranged at intervals around the circular through hole or continuously arranged around the circular through hole.

Thus, the fixed member is not provided with the dividing wall higher than the second front end face of the protruding part, in the above structure, a structure formed through combination of the circular ring-shaped groove and the cylindrical dividing wall is arranged on the outer peripheral side of the circular through hole, so that the garbage can be captured in the circular ring-shaped groove, and the garbage can be inhibited from falling onto the photosensitive sensor, so that the garbage can be prevented from being adhered to cause image defect.

Preferably, the overlapping amount between the circular ring-shaped groove and the cylindrical dividing wall is set to be greater than or equal to the maximum movement amount of the support along the lens moving direction, and the interval greater than or equal to one half of the protruding height of the protruding part is arranged between the protruding part and the cylindrical dividing wall. Thus, the overlapping amount and the interval are set as above mentioned, so that the lens driving device capable of effectively inhibiting the garbage from falling to the side of the photosensitive sensor can be obtained.

In an embodiment, a convex part protruding towards the outer side of the dividing wall in the diameter direction is arranged on the peripheral surface of the dividing wall, and a limiting part for clamping two side faces of the convex part in the peripheral direction of the dividing wall is arranged on the end face of the support.

Thus, the rotation direction of the lens and the transverse movement of the lens during falling impact can be limited, and the spring members for retaining the supports can be prevented from being deformed and damaged to cause the reduction of performance. Under the condition that the lens is suffered from the impact along the lens moving direction, the convex part is not in contact with the limiting part but is in contact with the protruding part of the fixed member and the support, so that the garbage is not generated by contact with the part.

In an embodiment, the protruding part is arranged on the magnet yoke, and a concave part embedded with the protruding part is formed in the other side of the support. Thus, the convex part of the magnet yoke and the concave part of the support are embedded with each other, the rotation direction of the lens and the transverse movement of the lens during falling impact can be limited, and the spring members for retaining the supports can be prevented from being deformed and damaged to cause the reduction of performance. Under the condition that the lens is suffered from impact along the lens moving direction, even if the garbage is generated at the part, the garbage is positioned on the part away from the cylindrical dividing wall, so that the generated garbage can be inhibited from falling onto the photosensitive sensor, and the garbage can be prevented from being adhered to cause image defect.

Preferably, the spring members include first spring member and second spring member, the first spring member are used for connecting one end of the support close to the side of the outlet end of the lens with the fixed members; and the second spring member are used for connecting one end of the support close to the side of the inlet end of the lens with the fixed members. The height, relative to the substrate surface of the substrate, of the second front end face of the protruding part is greater than the height of the first spring member for being fixed on one side of the substrate surface of the substrate.

Thus, the height between the substrate surface of the substrate for fixing the fixed member at one end of the first spring member and the surface of the flange part for fixing the support at the other end of the first spring member becomes longer, and spring recuperability of the first spring member for pulling the support to the side of the fixed member can become greater, so that the support can be inhibited from floating from the fixed member. Therefore, the support can be inhibited from falling due to gravity even if the support is at the posture on the lower side of the fixed member, and the interval between the support and the second front end face of the protruding part of the fixed member can be minimum, so that the garbage can be inhibited from invading into the photosensitive sensor.

BRIEF DESCRIPTION OF THE SEVERAL VIEWS OF THE DRAWING(S)

FIG. 1A a section view of a lens driving device in accordance with a first embodiment of the present invention (an A-A cross section as shown in FIG. 1B).

DETAILED DESCRIPTION OF THE INVENTION

Embodiment I

Figure 1A:
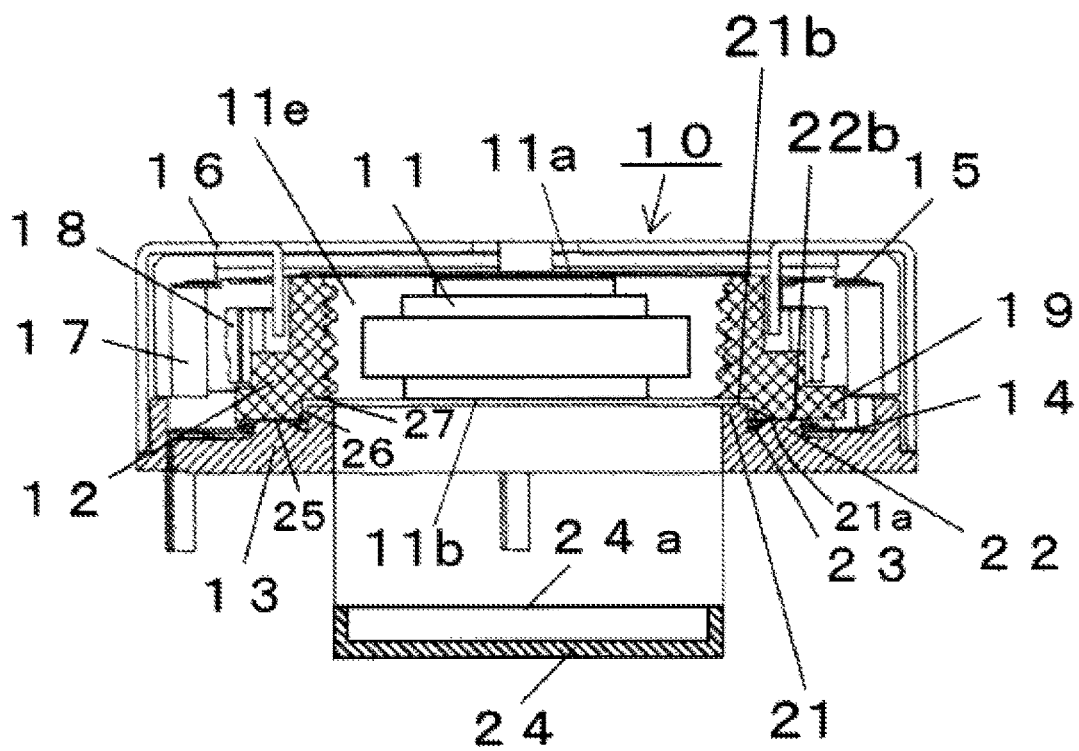
FIG. 1B is a top view of the lens driving device in the first embodiment of the present invention (observed from the side of a lens inlet end).
Figure 1B:
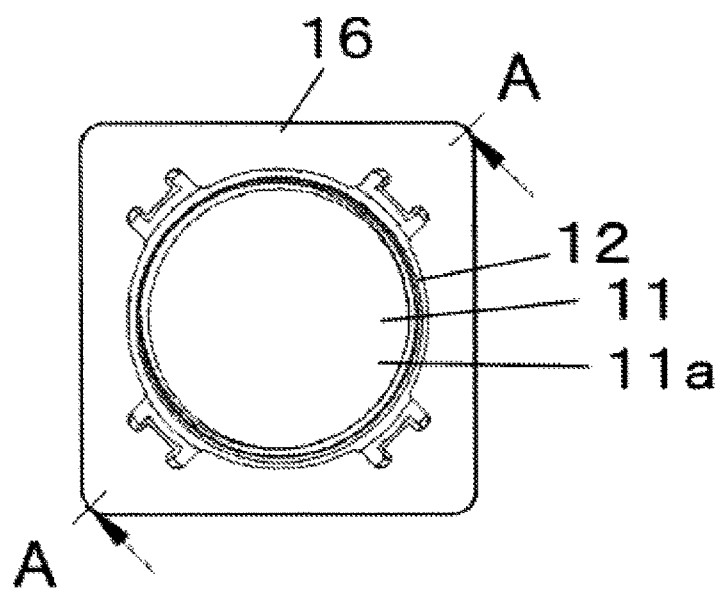
Figure 2:
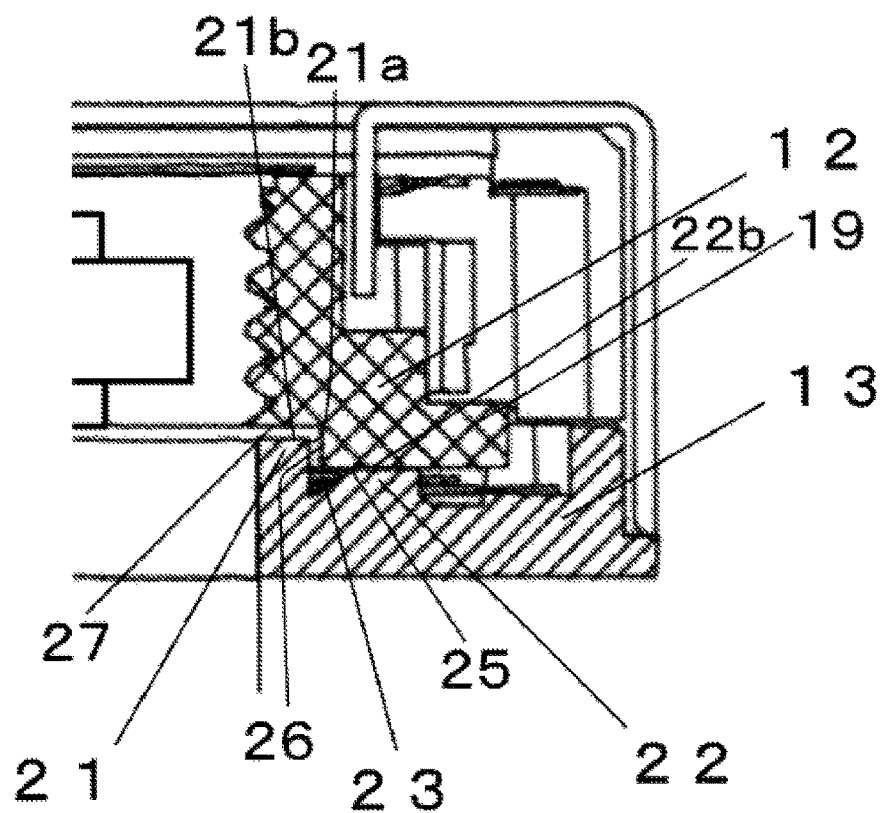
FIG. 2 is a section view of main parts of the lens driving device in the first embodiment.

As shown in FIG. 1A and FIG. 2, in a first embodiment, a lens driving device 10 includes a lens 11, a lens support 12 for retaining the lens 11, a fixed member 13 configured at one end of each of the lens support 12, two spring members for connecting the lens support 12 and the fixed member 13, and electromagnetic driving assembly. The lens 11 is provided with an inlet end 11a close to an object to be shot and an outlet end 11b on the opposite side of the inlet end 11a. The fixed member 13 is arranged on one side of the outlet end 11b of the lens 11, and a photosensitive sensor 24 is arranged below or on the fixed member 13. The electromagnetic driving assembly include a coil 18 wound on the lens support 12, and magnets 17 and magnet yokes 16 which are arranged relatively to the coil 18. A winding shaft of the coil 18 is parallel with the optical axis of the lens 11. When current flows into the coil 18, the lens support 12 obtains driving force (lorentz force), therefore, the lens 11 retained on the lens support 12 moves along the winding shaft direction of the coil 18 and focuses on an illuminated face 24a of the photosensitive sensor 24.

Spring members are a first spring member 14 and a second spring member 15. The first spring member 14 is used for connecting an end (lower side in FIG. 1A), close to the outlet end 11b, of the lens support 12 with the fixed member 13. The second spring member 15 is used for connecting the other end (upper side in FIG. 1A), close to the inlet end 11a, of the lens support 12 with the fixed member 13.

Figure 3A:
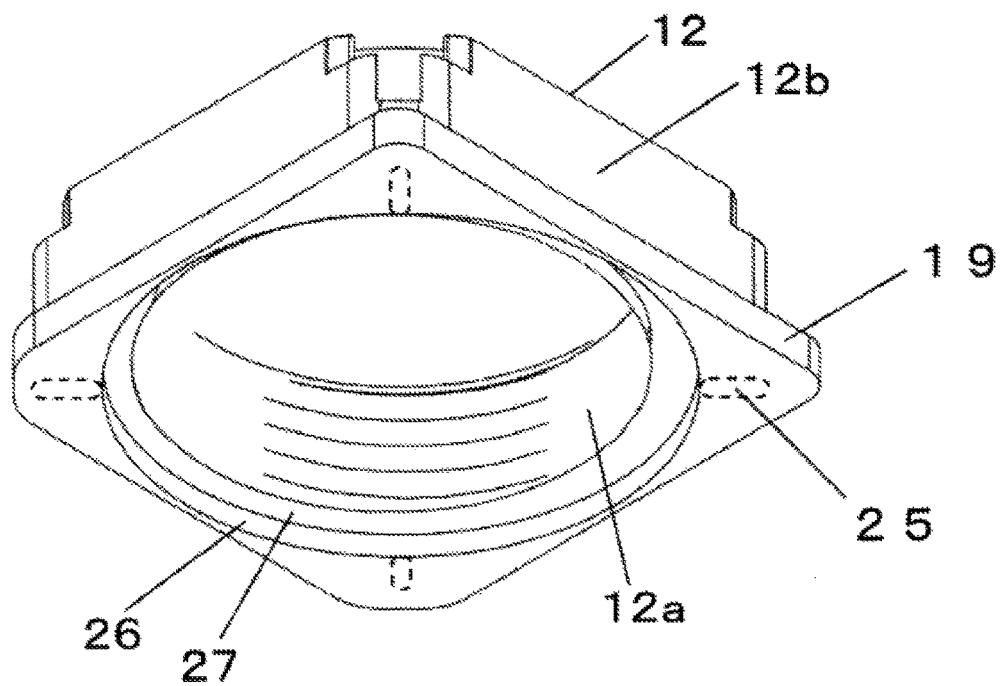
FIG. 3A is a space diagram of a support of the lens driving device in the first embodiment.
Figure 3B:
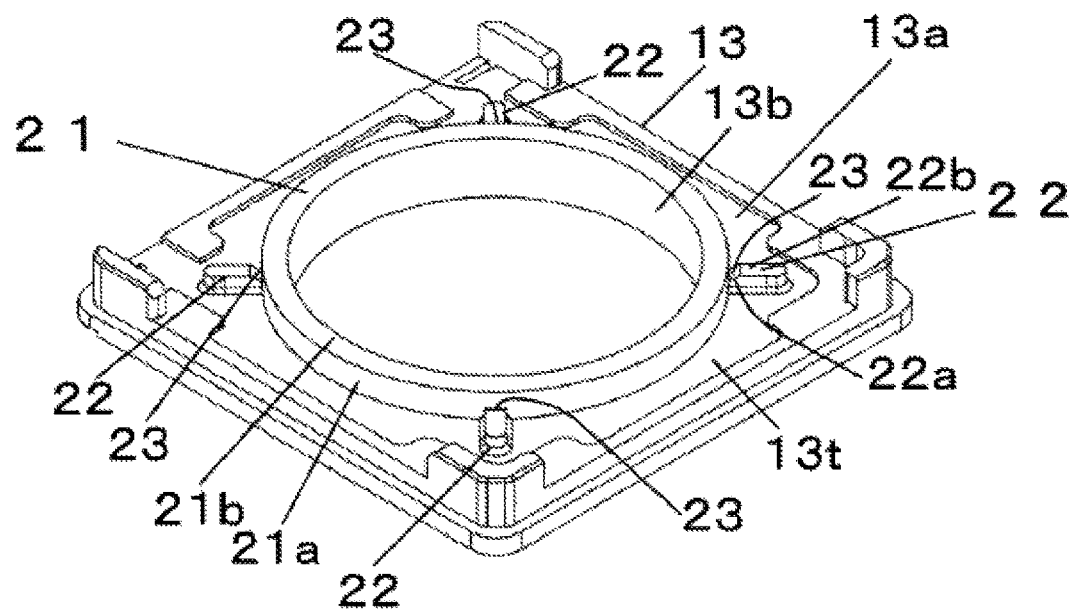
FIG. 3B is a space diagram of a fixed member of the lens driving device.

As shown in FIG. 3B, the fixed member 13 is provided with a substrate 13a defining a circular through hole 13b, a dividing wall 21, several protruding parts 22 and concave parts 23.

In the embodiment, the substrate 13a is in a shape of a square plate, the circular through hole 13b taking the optical axis of the lens 11 as a center shaft are formed in the centers of the substrate 13a, and the circular through hole 13b is opposite to the photosensitive sensor 24. The dividing wall 21 extends perpendicularly from an edge of the circular through hole 13b towards the lens support 12, so that the dividing wall 21 is cylindrical and protrudes from the substrate surface 13t of the substrate 13a. The protruding parts 22 protrude from the substrate surface 13t of the substrate 13a to the side of the lens support 12, and are lengthened from the peripheral surface of the dividing wall 21 to the outer side of the circular through hole 13b in the diameter direction.

The diameter of the circular through hole 13b is formed to be greater than or equal to the maximum caliber size of the lens 11.

A plurality of protruding parts 22 are arranged at intervals along the circumference of the circular through hole 13b or continuously arranged along the whole circumference of the circular through hole 13b. For example, three or more than three protruding parts 22 are arranged at equal intervals along the circumferential direction of the circular through hole 13b. Specifically, as shown in FIG. 3B, four protruding parts 22 are arranged at intervals in a central angle of 90 degrees along the circumferential direction of the circular through hole 13b.

As shown in FIG. 3A, the lens support 12 is provided with a cylindrical part 12b and a flange part 19. A cylinder hole-shaped lens installing hole 12a for the lens 11 to be installed is formed in the cylindrical part 12b; and the flange part 19 is formed on one end (lower side in FIG. 3A) of the cylindrical part 12b in the manner of protruding from the outer peripheral surface of the cylindrical part 12b to the outer side of the cylindrical part 12b in the diameter direction. The lens 11 is installed on the inner side of the cylindrical parts 12b in virtue of a fixed mount 11e (referring to FIG. 1A), so that the optical axis of the lens 11 is aligned to the center shafts of the cylindrical parts 12b.

And then, the outlet end 11b, opposite to the inlet end 11a, of the lens 11 is opposite to the circular through holes formed in the fixed member 13 at intervals of the photosensitive sensor 24 and the internal spaces of the cylindrical dividing walls 21.

As shown in FIG. 3B, each protruding parts 22 arranged on the fixed member 13 is provided with a front end face 22a adjacent to the outer peripheral surface of the dividing wall 21 and a second front end face 22b which extends from the first front end face 22a towards an outer edge of the fixed member 13 in the diameter direction and is in contact with one end face (lower surface) 25 of the flange part 19 of the lens support 12. Moreover, the front end face 22a is formed at the part closer to the substrate surface 13t of the substrate 13a than the second front end face 22b, and thus the front end face 22a acts as a bottom surface of the concave part 23 which is concave preferably towards the side of the substrate surface 13t of the substrate 13a compared with the second front end face 22b.

Namely, the fixed member 13 is provided with concave parts 23 formed between the second front end face 22b of the protruding parts 22 and the outer peripheral surface of the dividing wall 21.

Figure 4A:
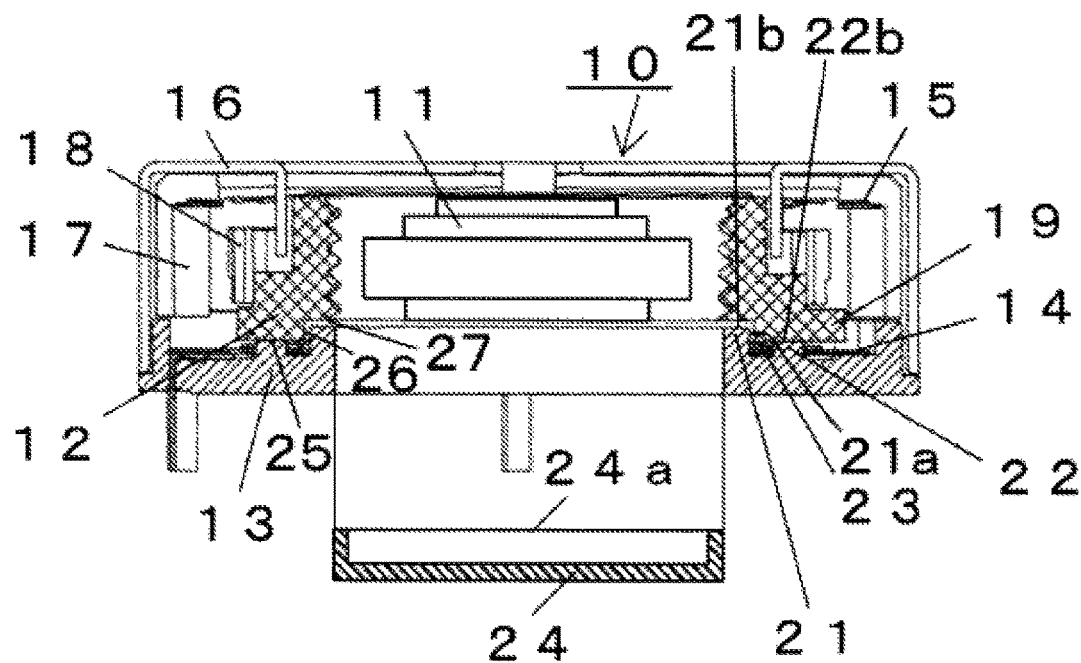
FIG. 4A is a section view of the lens driving device in the first embodiment.
Figure 4B:
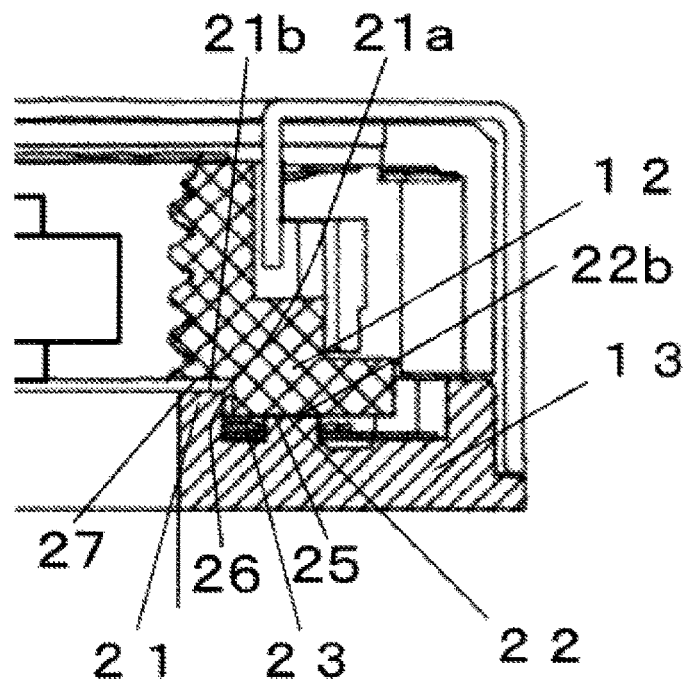
FIG. 4B is a section view of main parts of the lens driving device.

Moreover, the shape of the concave part 23 is unrestricted specially, for example, the cross-section shape of the concave part 23 (cross-section shape when the fixed member 13 is cut by using the surface along the center shaft of the dividing wall 21) is formed in the shape of a triangle as shown in FIG. 1A and FIG. 2, a quadrangle or a semi-circle as shown in FIG. 4.

As shown in FIG. 3A, the lens support 12, at the end opposite to the fixed member 13, is provided with an end face 25, a cylindrical inner peripheral surface 26 and an ring-shaped end surface 27, the end face 25 is in contact with the second front end face 22b of the protruding parts 22 and is arranged opposite to the concave part 23; the cylindrical inner peripheral surface 26 extends from the end face 25 and is arranged opposite to the outer peripheral surface 21a of the dividing wall 21; and the ring-shaped end surface 27 extends from the inner peripheral wall 26 and is arranged opposite to the end face 21b of the dividing wall 21.

Moreover, the height relation between the dividing wall 21 and the protruding parts 22 is such formed that the height between the substrate surface 13t of the substrate 13a and the end face 21b of the dividing wall 21 is greater than that between the substrate surface 13t of the substrate 13a and the second front end face 22b of the protruding parts 22.

And then, the second front end face 22b of the protruding parts 22 is in contact with the end face 25 of the lens support 12 so as to restrict the initial height of the lens in the moving direction.

Moreover, the first spring member 14 and the second spring member 15 for retaining the lens 12 have certain thicknesses in the moving direction of the lens, and are both plate springs. Thus, the lens moving direction is the direction of damage mostly suffering from falling impact, during falling, under the effect of impact force in the lens moving direction, the contact part between the fixed member 13 and the lens support 12 (contact part between the end face 25 of the lens support 12 and the second front end face 22b of the protruding parts 22) is deformed or damaged, so that the possibility that garbage is generated exists. For example, the second front end face 22b of the protruding parts 22 is worn to generate powdery micro particles.

With respect to impact force stressed in the transverse offset direction of the lens, in the range that the first spring member 14 and the second spring member 15 are elastically deformed, the first spring member 14 and the second spring member 15 cannot be deformed along the direction, so that the movement amount of the lens support 12 can be inhibited. Therefore, under the condition that the lens is impacted in the transverse offset direction, the impact force applied to the contact part can be ignored compared with the impact force applied in the lens moving direction.

Therefore, the lens driving device 10 in the first embodiment is provided with the followings, namely, under the condition of impact application in the lens moving direction, the second front end face 22b of the protruding parts 22 of the fixed member 13 is in contact with the end face 25 of the lens support 12, so that the suffered impact is blocked; and moreover, the concave parts 23 are arranged between the second front end face 22b of the protruding parts 22 of the fixed member 13 and the outer peripheral surface 21a of the cylindrical dividing wall 21 in the support direction.

The lens driving device 10 according to the first embodiment is provided with the cylindrical dividing wall 21 and the second front end face 22b of the protruding parts 22, the cylindrical dividing wall 21 is used for restricting transverse movement of the lens 11 and inhibiting deposition of the garbage; and the concave part 23 is arranged between the second front end face 22b of the protruding parts 22 and the dividing wall 21, and is used for restricting the initial height of the lens in the lens moving direction. Therefore, under the condition that the second front end face 22b of the protruding parts 22 is in contact with the end face 25 of the support 22, a certain interval is retained between the end face 21b of the dividing wall 21 and the ring-shaped end surface 27 of the lens support 12, so that the end face 21b of the dividing wall 21 of the fixed member 13 does not collide with the ring-shaped end surface 27 of the lens support 12 in the lens moving direction.

And then, even though the device is impacted along the lens moving direction, the second front end face 22b of the protruding parts 22 of the fixed member 13 collides with the end face 25 of the lens support 12, the garbage is generated due to the collision, but the lens driving device is provided with the cylindrical dividing wall 21 which is higher than the second front end face 22b of the protruding parts 22 of the fixed member 13 in height and is further provided with the concave part 23 between the second front end face 22b of the protruding parts 22 and the outer peripheral surface 21a of the dividing wall 21, so that the garbage falls into the concave part 23 and is also difficult to reach to the cylindrical dividing wall 21 or even adhered onto the dividing wall 21, and thus the garbage can be effectively inhibited from falling to the side of the photosensitive sensor 24.

Namely, as existing technology, under the condition that the mostly front end face of the protruding part is formed to be connected with the outer peripheral surface of the dividing wall on the same plane orthorhombic with the center shaft of the cylindrical dividing wall, the garage easily reaches the dividing wall, and under the condition that the garbage is adhered onto the dividing wall, the possibility that the garbage is adhered onto the dividing wall, is invaded into the inner side of the dividing wall, and even falls to one side of the photosensitive sensor; however, in the first embodiment, the concave part 23 is arranged between the second front end face 22b of the protruding parts 22 and the outer peripheral surface 21a of the dividing wall 21, so that the distance between the bottom of the concave part 23 and the end face 21b of the dividing wall 21 becomes longer, and the end face 25 of the lens support 12 is positioned at the part opposite to the concave part 23; and therefore, under the condition that the garbage falls into the concave part 23, the garbage is difficult to reach the cylindrical dividing wall 21 and is also difficult to be adhered to the end part 21b of the dividing wall 21.

Moreover, the concave part 23 is arranged between the second front end face 22b of the protruding parts 22 and the outer peripheral surface 21a of the dividing wall 21, thus the contact area between the second front end face 22b of the protruding parts 22 and the lens support 12 can be reduced, and the garbage generated by collision can be reduced.

Embodiment II

Figure 5A:
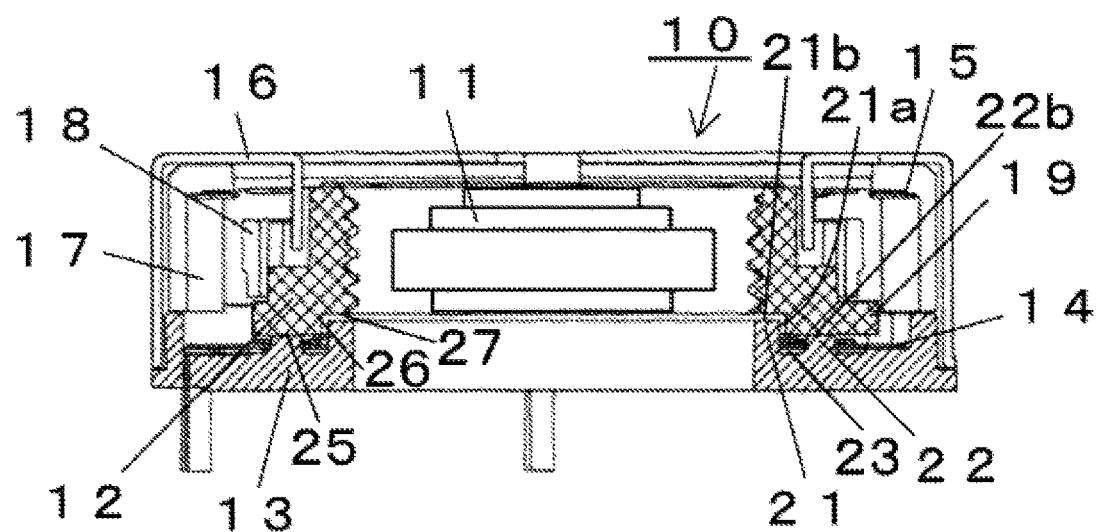
FIG. 5A is a section view of a lens driving device in accordance with a second embodiment.
Figure 5B:
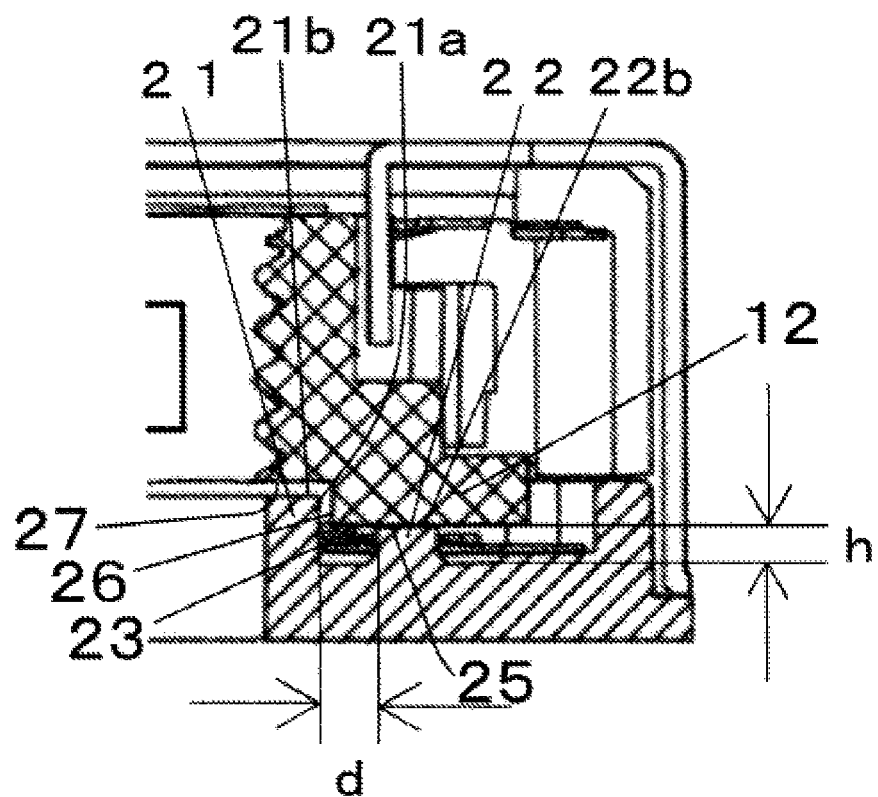
FIG. 5B is a section view of main parts of the lens driving device in the second embodiment.

In a lens driving device 10 as shown in FIG. 5A and FIG. 5B in accordance with the second embodiment, the overlapping amount in the lens driving direction between the end face 21b of the cylindrical dividing wall 21 and the end face 25 of the support in contact with the second front end face 22b of the protruding parts 22 is set to be greater than or equal to the maximum movement amount of the lens support 12 along the lens driving direction. Namely, the height difference of the end face 21b relative to the end face 25 in the direction of optical axis is greater than or equal to the maximum movement amount of the lens support 12 in the direction of the optical axis. Moreover, the width d of the concave part 23 along the diameter direction of the cylindrical dividing wall 21 is set to be greater than or equal to one half of the protruding height h of the second front end face 22b of the protruding parts 22.

For the purpose that the garbage cannot be adhered onto the cylindrical dividing wall 21, the second front end face 22b of the protruding parts 22 of the fixed member 13 and the outer peripheral surface 21a of the cylindrical dividing wall 21 as garbage generating sources cannot extend continuously, and the distance between the second front end face 22b of the protruding parts 22 and the outer peripheral surface 21a of the dividing wall 21 is extended.

And then, when the protruding height h between the substrate surface 13t of the substrate 13a and the second front end face 22b of the protruding parts 22 is reduced, or the height difference between the second front end face 22b of the protruding parts 22 and the bottom surface (first front end face 22a) of the concave part is reduced, or the width d of the concave part 23 is shortened, the possibility that the garbage generated on the second front end face 22b of the protruding parts 22 is adhered onto the cylindrical dividing wall 21 is increased.

The inventor has the following understandings that, for the purpose that the garbage generated on the second front end face 22b of the protruding parts 22 of the fixed member 13 does not reach the part of the cylindrical dividing wall 21 and is not adhered onto the cylindrical dividing wall 21, the overlapping amount (height difference) in the lens driving direction between the end face 21b (upper end part of the dividing wall 21 in FIG. 5) of the cylindrical dividing wall 21 and the end face 25 (lower end part of the lens support 12 in FIG. 5) of the lens support 12 needs to be set to be greater than or equal to the maximum movement amount of the lens support 12 along the lens driving direction, and the width d of the concave part 23 between the second front end face 22b of the protruding parts 22 and the dividing wall 21 is set to be greater than or equal to one half of the protruding height h of the protruding parts 22.

In such set, even if the lens support 12 drastically collides with the fixed member 13 under the effect of falling impact, the garbage is generated on the second front end face 22b of the protruding parts 22, the generated garbage cannot reach the outer peripheral surface 21a of the cylindrical dividing wall 21, and the garbage can fall into the concave part 23 even if the garbage can reach the outer peripheral surface 21a, so that the garbage can be inhibited from being attached onto the cylindrical dividing wall 21 and then falling onto the photosensitive sensor 24.

Embodiment III

Figure 6A:
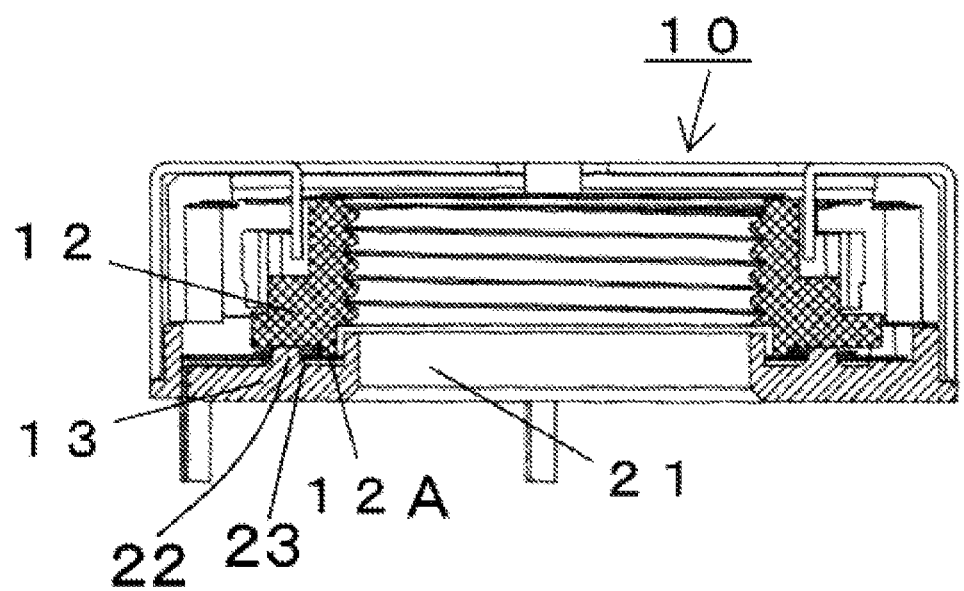
FIG. 6A is a section view of a lens driving device in accordance with a third embodiment.
Figure 6B:
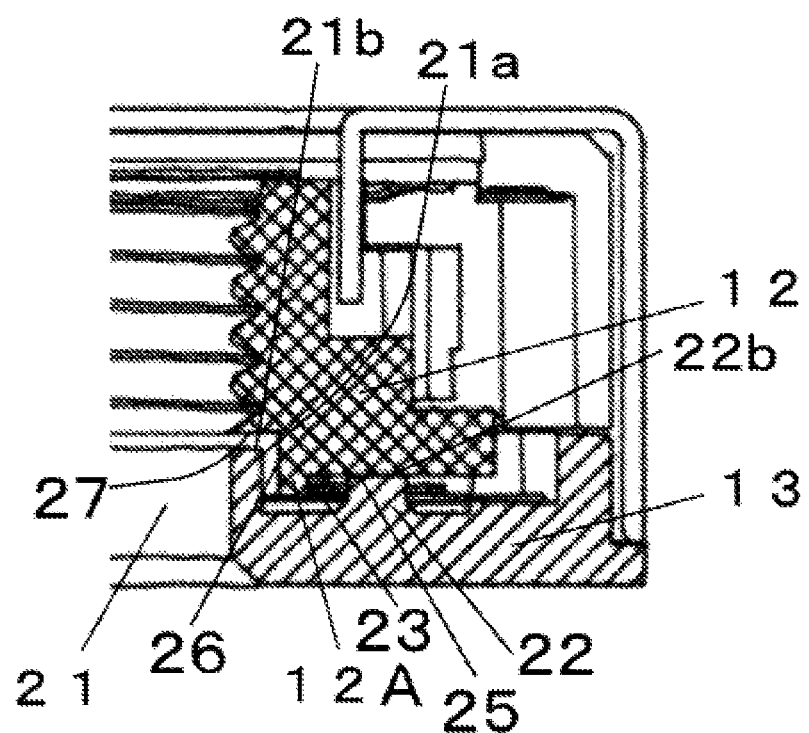
FIG. 6B is a section view of main parts of the lens driving device in the third embodiment.

In the lens driving device 10 as shown in FIG. 6A and FIG. 6B in the third embodiment, the lens support 12 is provided with the cylindrical dividing wall 12A which extends from the end face 25 arranged opposite to the concave part 23 and is positioned inside the concave part 23.

Generally, when a camera is used in the state that the lens 11 is downward, the garbage generated from the contact surface between the lens support 12 and the fixed member 13 moves along the surface of the lens support 12, and the garbage possibly falls onto the photosensitive sensor 24 from the gap between the lens support 12 and the fixed member 13.

Similar to the third embodiment, the cylindrical dividing wall 12A positioned inside the concave part 23 is arranged on the lens support 12, so that the garbage generated from the contact part between the second front end face 22b of the protruding parts 22 and the lens support 12 can be prevented from moving towards the side of the photosensitive sensor 24 in virtue of the cylindrical dividing wall 12A, and the garbage is inhibited from falling onto the photosensitive sensor 24, so that the garbage can be prevented from being adhered to cause image defect.

Embodiment IV

Figure 7A:
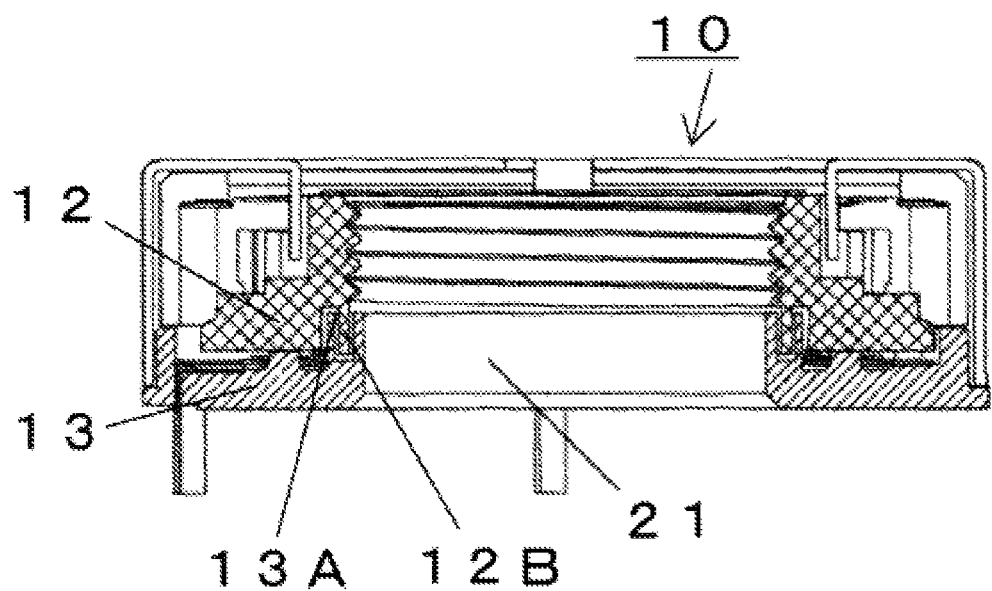
FIG. 7A is a section view of a lens driving device in accordance with a fourth embodiment.
Figure 7B:
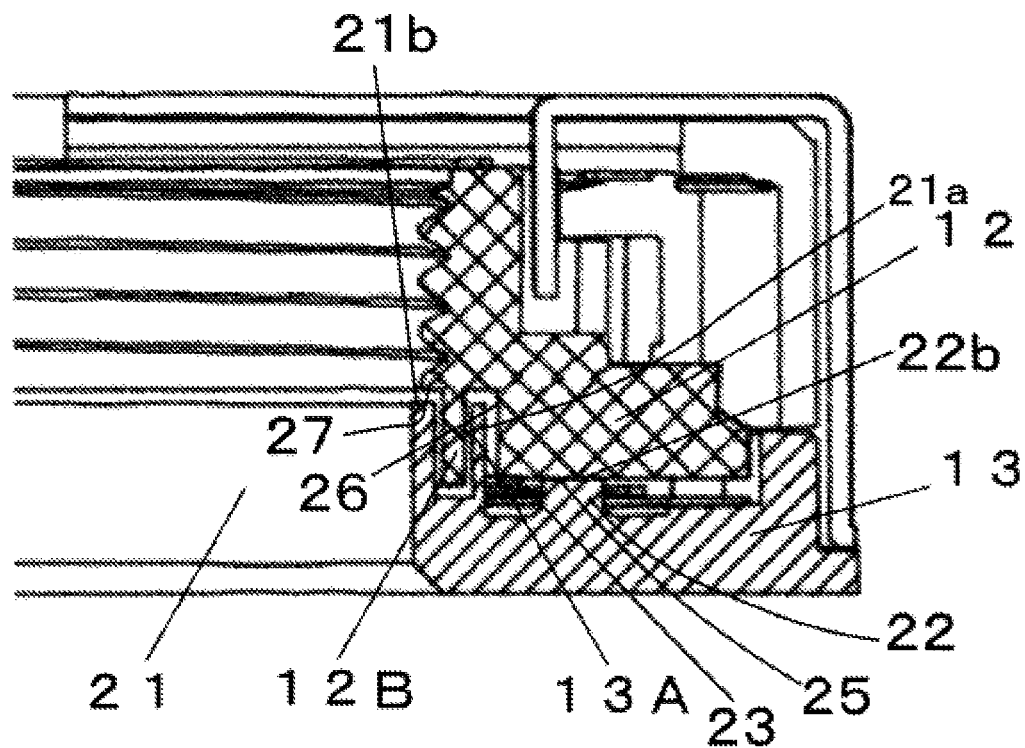
FIG. 7B is a section view of main parts of the lens driving device in the fourth embodiment.

As shown in FIG. 7A and FIG. 7B, a circular ring-shaped groove 13A concave towards the side of the substrate 13a from the end face 21b is formed in the dividing wall 21 of the fixed member 13 of the lens driving device 10 in the fourth embodiment. The inner wall surface of the circular ring-shaped groove 13A is arranged on the back of the inner peripheral surface and the outer peripheral surface of the dividing wall 21 respectively. The lens support 12 is provided with a cylindrical dividing wall 12B which extends towards the bottom direction of the circular ring-shaped groove 13A and inserts in the circular ring-shaped groove 13A.

In other words, in the overlapping part between the lens support 12 and the fixed member 13, a cylindrical wall body for forming the inner peripheral surface of the circular ring-shaped groove 13A arranged on the fixed member 13, a cylindrical wall body for forming the outer peripheral surface of the circular ring-shaped groove 13A and the cylindrical dividing wall 12B arranged on the support are formed in the shape of a mouth. Therefore, the garbage generated inside the lens driving device 10 is prevented from moving towards the inner side of the dividing wall 21, and the garbage can be inhibited from falling onto the photosensitive sensor 24, so that the garbage can be prevented from being adhered to cause image defect.

Moreover, in order to further improve the effect that the garbage is prevented from falling onto the photosensitive sensor 24, preferably the overlapping amount in the lens moving direction among the cylindrical wall body for forming the inner peripheral surfaces of the circular ring-shaped grooves 13A arranged on the fixed member 13, the cylindrical wall body for forming the outer peripheral surfaces of the circular ring-shaped grooves 13A and the cylindrical dividing wall 12B arranged on the lens support 12 is set to be greater than or equal to the maximum movement amount of the lens support 12 along the lens driving direction.

Embodiment V

As shown in FIG. 8A, FIG. 8B, FIG. 9A and FIG. 9B, the lens driving device 10 in the fifth embodiment is such formed that an annular groove 13B concave from the outer peripheral surface 21a of the dividing wall 21 to the inner peripheral surface of the dividing wall 21 is formed in the whole circumference of the outer peripheral surface of the cylindrical dividing wall 21, and the annular groove 13B and the concave part 23 are continuously formed. The continuous annular groove 13B is connected with the inner side surface of the concave part 23.

Figure 8A:
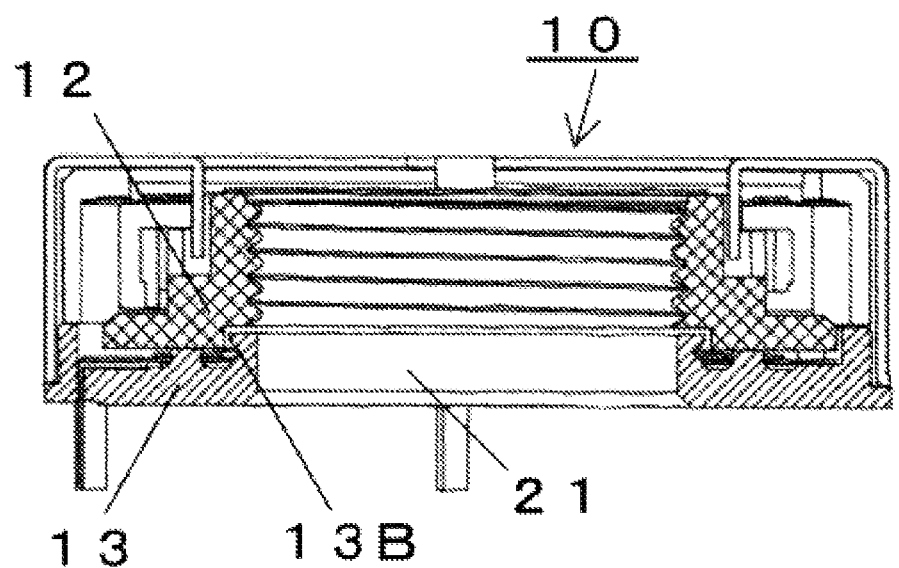
FIG. 8A is a section view of a lens driving device in accordance with a fifth embodiment.
Figure 8B:
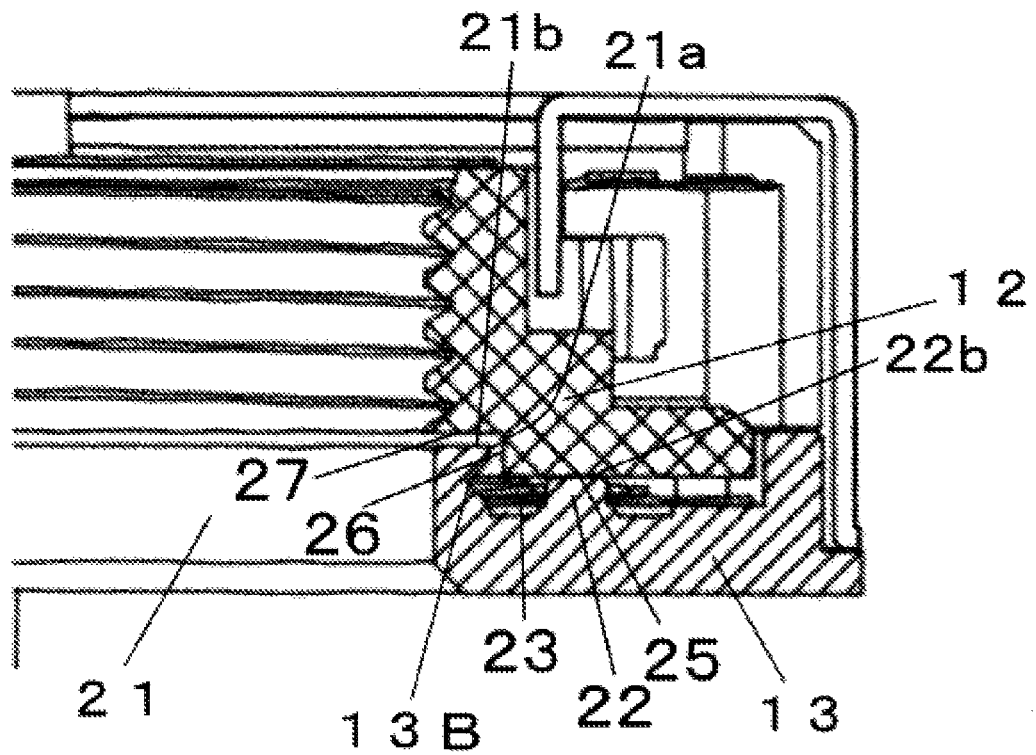
FIG. 8B is a section view of main parts of the lens driving device in the fifth embodiment.
Figure 9A:
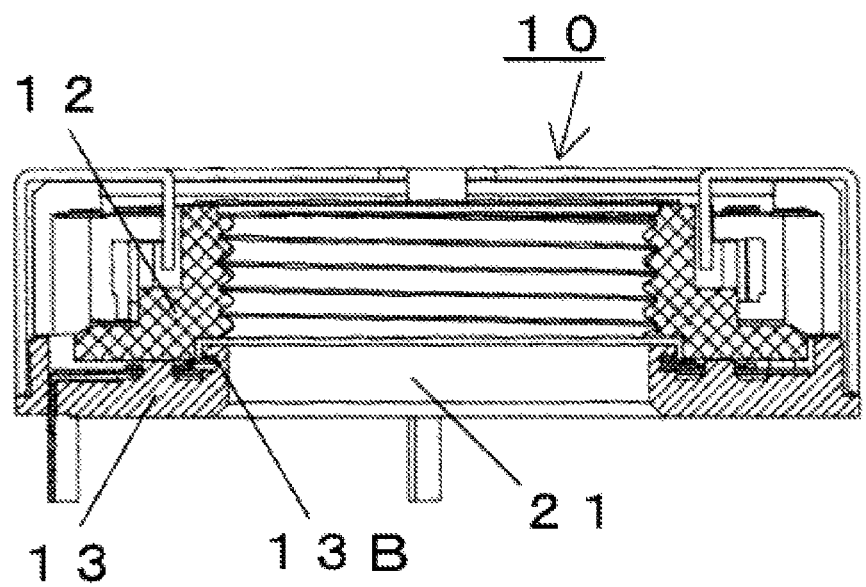
FIG. 9A is a section view of the lens driving device in the fifth embodiment.
Figure 9B:
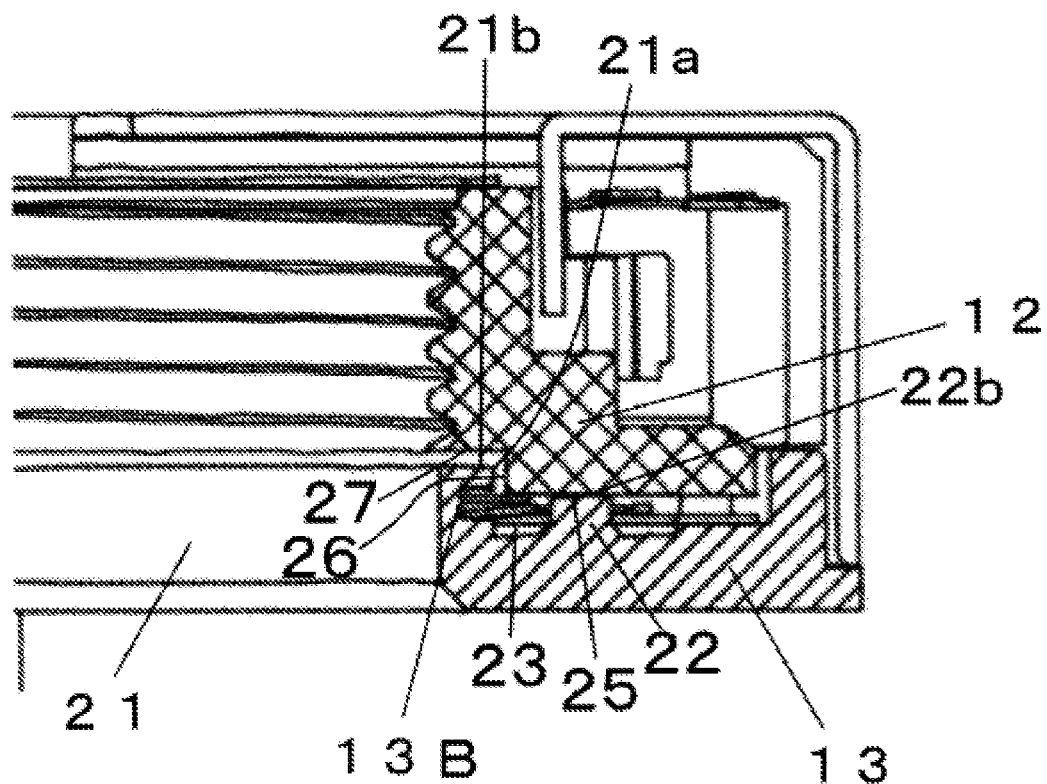
FIG. 9B is a section view of main parts of the lens driving device in the fifth embodiment.

As long as the cross section shape (cross section shape when the fixed member 13 is cut along the face extending along the center shaft of the dividing wall) of the annular groove 13B is formed into the shape of a triangle as shown in FIG. 8A and FIG. 8B or a quadrangle as shown in FIG. 9A and FIG. 9B or a semi-circle, the annular groove 13B is formed in the whole circumference of the outer peripheral surface 21a of the cylindrical dividing wall 21, the garbage possibly passing over the cylindrical dividing wall 21 can be captured by the annular groove 13B, and the garbage can be inhibited from falling onto the photosensitive sensor 24, so that the garbage can be prevented from being adhered to cause image defect.

Embodiment VI

Figure 10A:
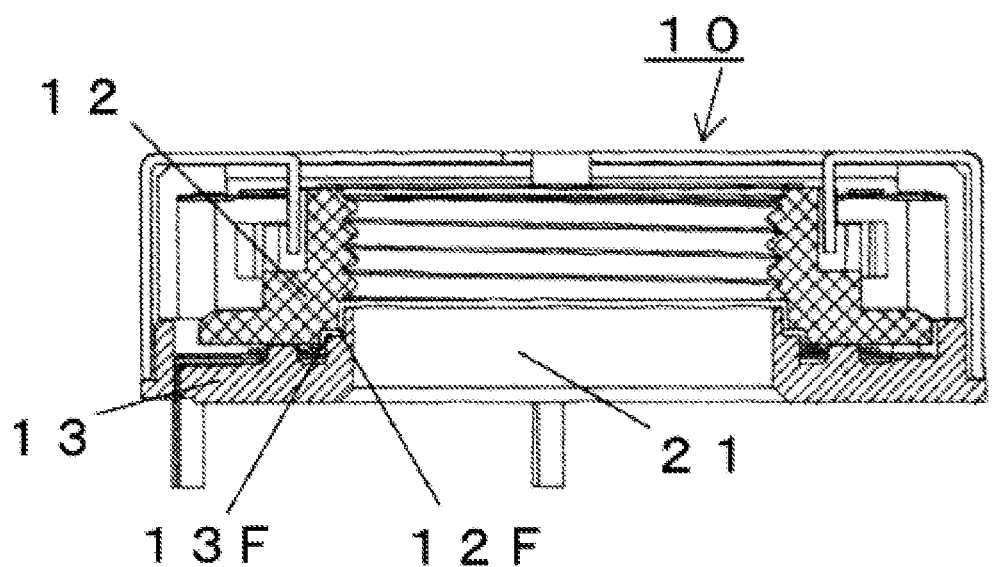
FIG. 10A is a section view of ae lens driving device in accordance with a sixth embodiment.
Figure 10B:
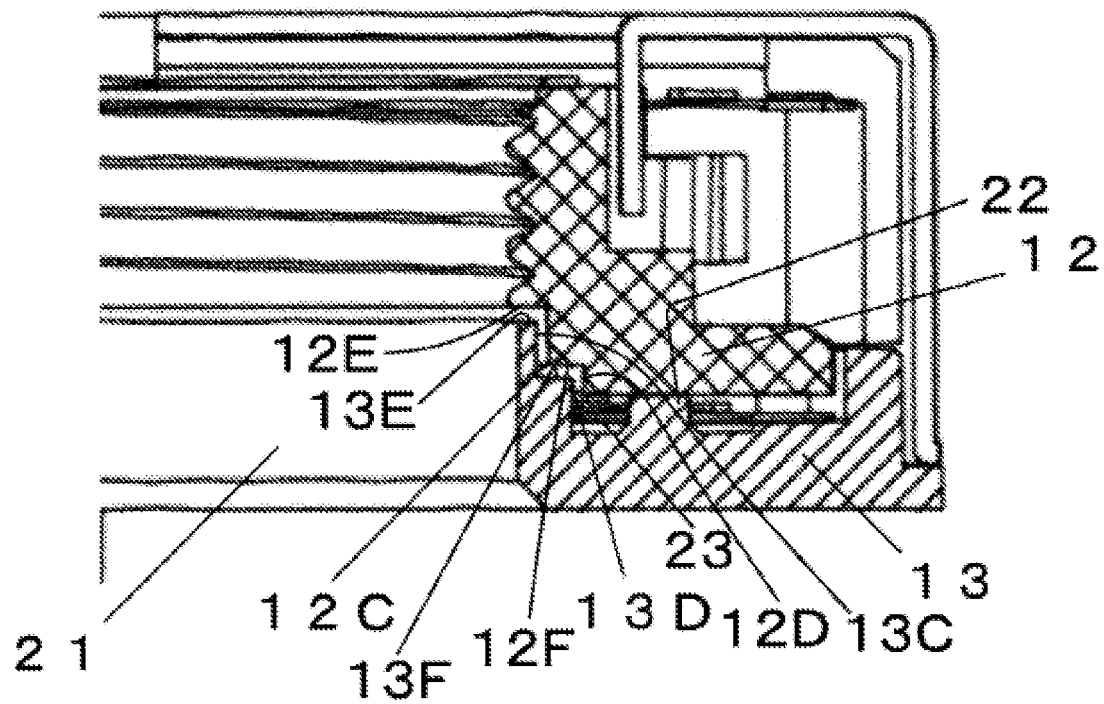
FIG. 10B is a section view of main parts of the lens driving device in the sixth embodiment.

As shown in FIG. 10A and FIG. 10B, the dividing wall 21 of the lens driving device 10 in the sixth embodiment is provided with a plurality of outer peripheral surfaces 13C and 13D with different diameters using the center shaft of the dividing wall 21 as the center, and then the end, arranged opposite to the fixed member 13, of the lens support 12 is provided with a plurality of cylindrical inner peripheral surface 12C and 12D arranged opposite to the outer peripheral surfaces 13C and 13D with different diameters and annular surfaces 12E and 12F at the end, opposite to the end faces 13E and 13F at the end of the outer peripheral surfaces 13C and 13D with different diameters.

In other words, in the overlapping part between the lens support 12 and the fixed member 13, the opposite surfaces between the lens support 12 and the fixed member 13 are oppositely arranged in the shapes of steps, so that the garbage generated in the interior of the lens driving device 10 can be inhibited from passing over the cylindrical dividing wall 21 to fall onto the photosensitive sensor 24, and the garage can be prevented from being adhered to cause image defect.

Moreover, in order to further improve the effect that the garbage is inhibited from falling onto the photosensitive sensor 24, preferably the overlapping amount in the lens moving direction of the overlapping part between the lens support 12 and the fixed member 13 is set to be greater than or equal to the maximum movement amount of the lens support 12 along the lens driving direction.

Moreover, the device can also be combined with the components in one or two of the first embodiment to the sixth embodiment.

Embodiment VII

Figure 11A:
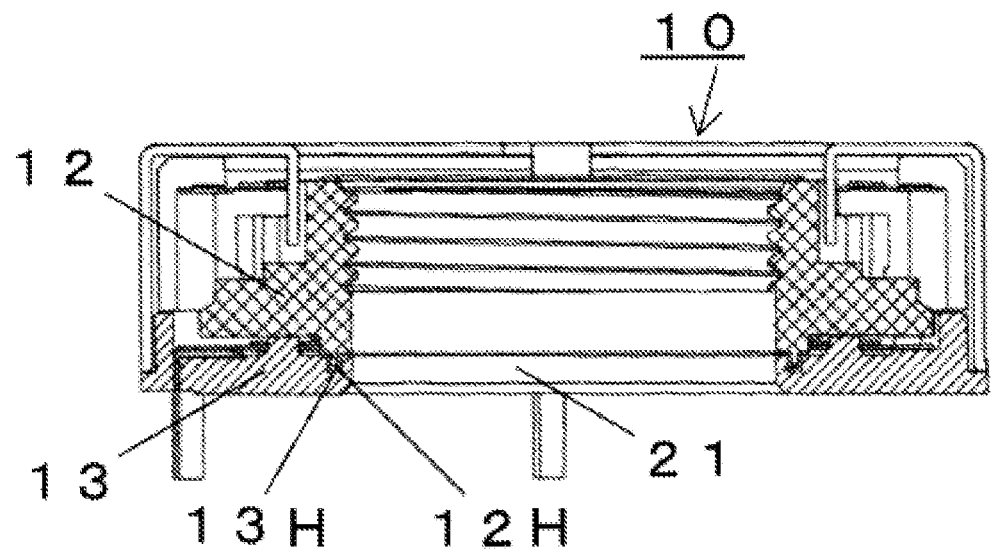
FIG. 11A is a section view of a lens driving device in accordance with a seventh embodiment.
Figure 11B:
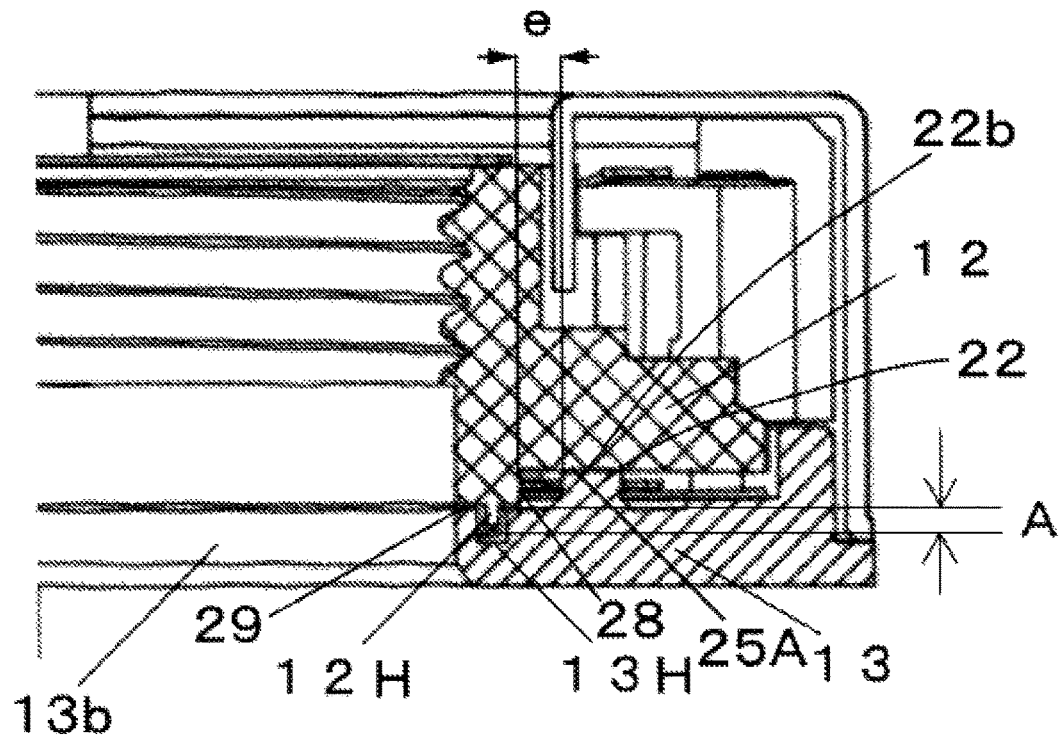
FIG. 11B is a section view of main parts of the lens driving device in the seventh embodiment.

As shown in FIG. 11A and FIG. 11B, the fixed member 13 of the lens driving device 10 in the seventh embodiment is provided with a substrate 13a defining a circular through hole 13b, a circular ring-shaped groove 13H formed in the substrate 13a around the periphery of the circular through hole 13b and protruding parts 22 which protrude from the substrate 13a on the peripheral side of the circular ring-shaped groove 13H; an outer peripheral end face 25A in contact with the second front end face 22b of each protruding parts 22, a cylindrical dividing wall 28 which extends from the outer peripheral end face 25A to the side of the substrate 13a, an end face 29 on the inner peripheral side in contact with the substrate 13a which extends from one end of the dividing wall 28, and a cylindrical dividing wall 12H which protrudes from the end face 19 on the inner peripheral side on the side of the fixed member 13 and is positioned inside the circular ring-shaped groove 13H are arranged on the end, opposite to the fixed member 13, of the support.

Namely, in the fixed member 13 without the dividing wall 21 higher than the second front end face 22b of the protruding parts 22, as mentioned above, the outer peripheral side of the circular through hole 13b is formed through the combination of the circular ring-shaped groove 13H and the cylindrical dividing wall 12H, the garbage can be captured inside the circular ring-shaped groove 13H, and the garbage can be inhibited from falling onto the photosensitive sensor 24, so that the garbage can be prevented from being adhered to cause image defect.

Moreover, the overlapping amount A between the circular ring-shaped groove 13H and the cylindrical dividing wall 12H is set to be greater than or equal to the maximum movement amount of the lens support 12 along the lens moving direction, and the effect that the garbage is prevented from falling onto the photosensitive sensor 24 can be further improved.

And then, the interval e which is greater than or equal to one half of the protruding height of the protruding part is arranged between the protruding parts 22 and the cylindrical dividing wall 28, so that the effect that the garbage is prevented from falling onto the photosensitive sensor 24 can be further improved.

Embodiment VIII

Figure 12A:
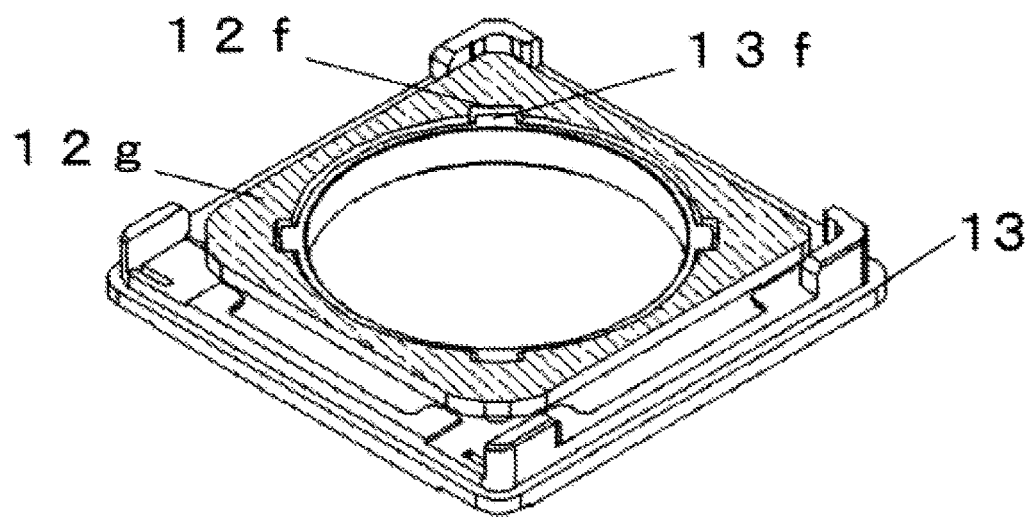
FIG. 12A is a section view of a part of a lens driving device in accordance with an eighth embodiment.
Figure 12B:
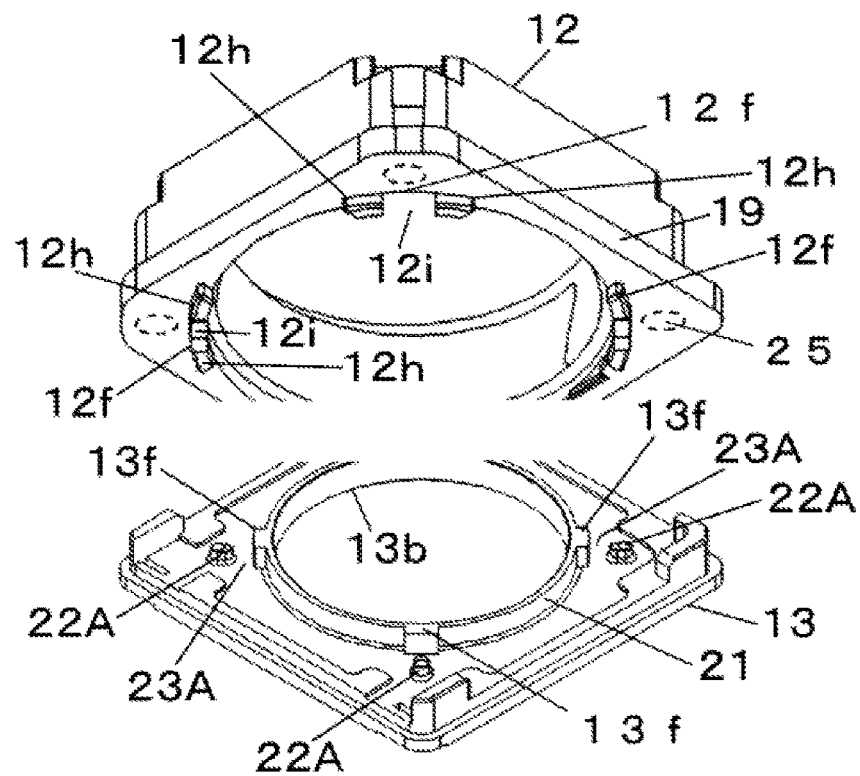
FIG. 12B is a space diagram of a support and a fixed member of the lens driving device in the eighth embodiment.

As shown in FIG. 12A and FIG. 12B, in the lens driving device 10 in the eighth embodiment based on the components in the first embodiment to the sixth embodiment, convex parts 13f protruding towards the outer side of the diameter direction of the dividing wall 21 are arranged on the outer peripheral surface 21a of the dividing wall 21, and limiting parts 12f which clamp the convex parts 13f and are positioned in the peripheral direction of the dividing wall 21 are arranged on the end face 25 of the lens support 12.

Moreover, in FIG. 12A, the relation between the horizontal cross section 12g near the lower end of the support and the fixed member 13 is illustrated, so that the state that the convex parts 13f and the limiting parts 12f are mutually embedded is realized.

The limiting part 12f is provided with a concave part 12i for one end of the convex part 13f to be embedded and limiting bodies 12h, the limiting bodies 12h and 12h are arranged on two sides of the concave part 12i in the peripheral direction, and the two side faces of the convex part 13f are clamped.

According to the lens driving device 10 in the eighth embodiment, the convex parts 13f and the limiting parts 12f are clamped with each other, so that the lens support 12 is inhibited from moving transversely and rotating in the direction of the optical axis.

For transverse impact, due to the fact that the two side faces of the convex part 13f are in contact with the limiting bodies 12h and 12h of the concave part 12f of the support, movement can be blocked, and the springs can be prevented from being deformed or broken by great movement of the lens support 12.

The convex part 13f also has the function that the support is inhibited from rotating in an angle larger than a constant angle under the condition that coercive force is stressed along the rotation direction when the lens 11 is inserted.

Even if under the condition that impact force is stressed along the lens moving direction during falling, the fixed member 13 and the lens support 12 are in contact with the end face 25 of the lens support 12 by using the second front end face of the protruding parts 22a for height limitation, and the convex part 13f cannot be suffered from greater impact force in the lens moving direction. Therefore, garbage is scarcely possible to be generated on the convex part 13*f*. That is the characteristic of the present invention which cannot be solved by an existing rotating mechanism.

Thus, transverse rotation and rotation in the direction of the optical axis of the support due to the impact force during falling is inhibited, so that the deformation and breaking of the springs for maintaining the support at the fixed part can be prevented.

Moreover, the interval is arranged between the protruding parts 22A and the outer peripheral surface of the convex part 13*f* of the dividing wall 21, and the interval plays roles as the concave part 23A, so that the garbage generated from the contact part between the second front end face 22*b* of the protruding parts 22 and the lens support 12 is also difficulty adhered onto the dividing wall 21 under the condition of falling into the concave part 23A, and the garbage can be inhibited from falling onto the photosensitive sensor 24.

Embodiment IX

Figure 13A:
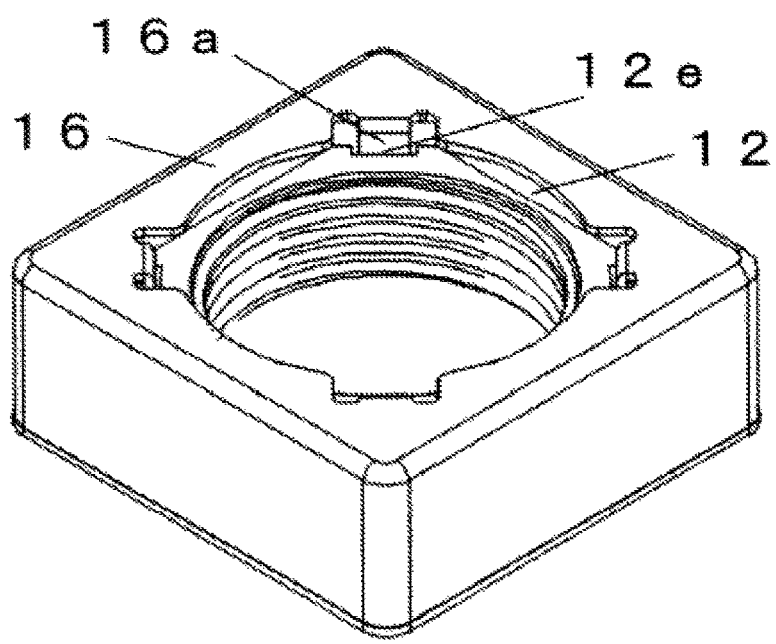
FIG. 13A is a space diagram of a lens driving device in accordance with a ninth embodiment observed from the side of a magnet yoke.
Figure 13B:
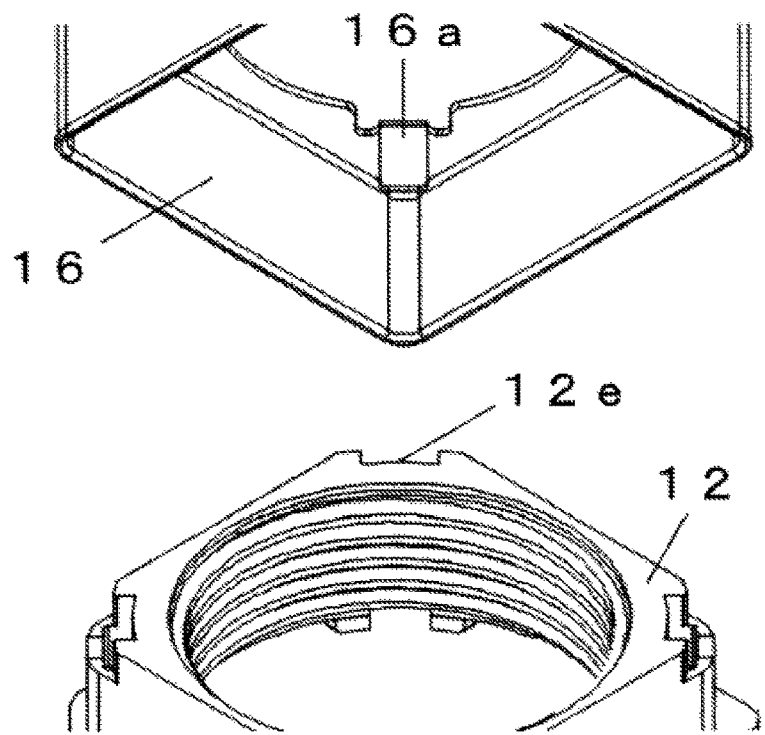
FIG. 13B is a space diagram of the magnet yoke and the support of the lens driving device in the ninth embodiment.
Figure 14A:
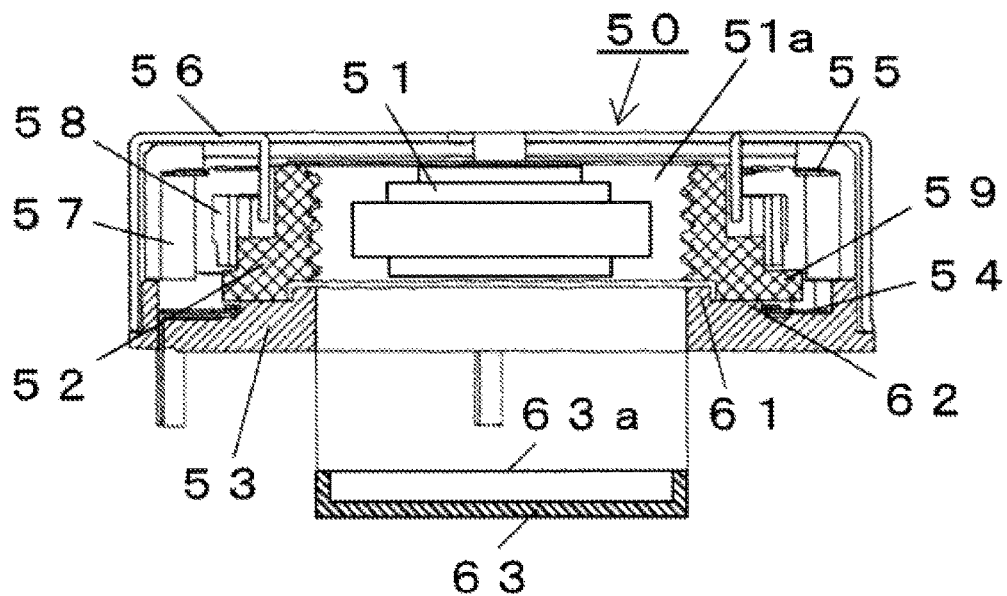
FIG. 14A is a section view of a lens driving device in an existing example.
Figure 14B:
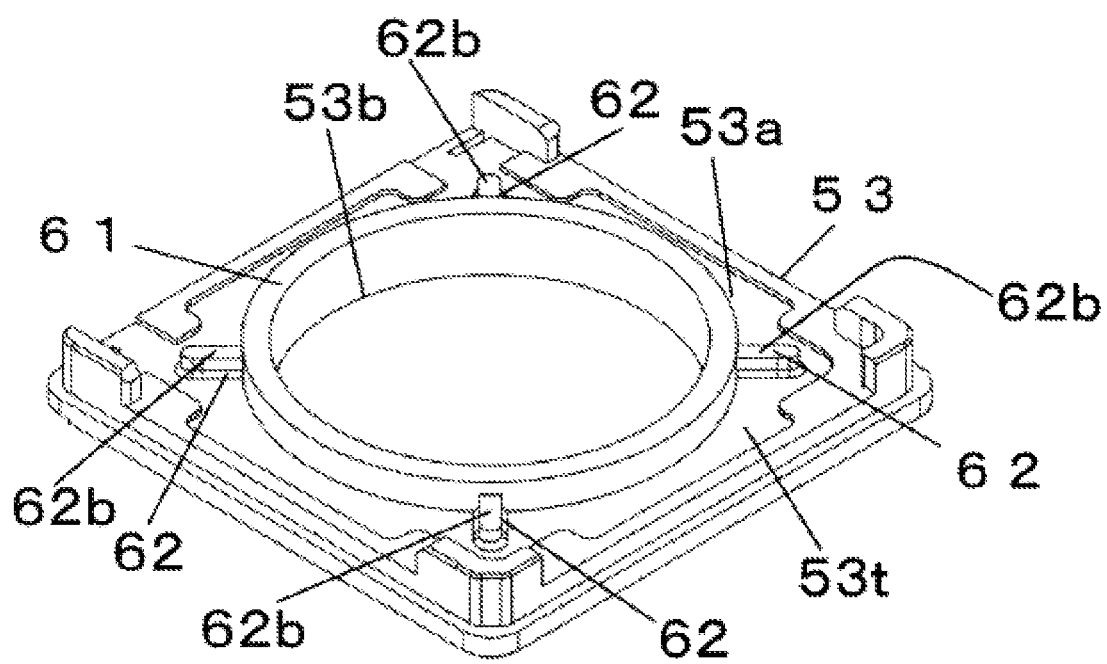
FIG. 14B is a space diagram of a fixed member of an existing lens driving device.

As shown in FIG. 13A and FIG. 13B, the lens driving device 10 in the ninth embodiment based on the components in the first embodiment to the eighth embodiment is provided with protruding parts 16*a* arranged on the magnet yokes 16 and concave parts 12*e* which are arranged on the other side of the lens support 12 and are embedded with the protruding parts 16*a*.

The protruding parts 16*a* arranged on the magnet yokes 16 and the concave parts 12*e* arranged on the other side (upper part in FIG. 13) of the lens support 12 are embedded with each other, so that the lens support 12 is inhibited from moving transversely and rotating in the direction of the optical axis.

For transverse impact, the surface on the outer side of the protruding part 16*a* of the magnet yoke 16 is in contact with the surface on the inner side of the concave part 12*e* of the lens support 12, movement can be blocked, and the springs can be prevented from being deformed or broken by great movement of the lens support 12.

The convex part 13*f* also has the function that the lens support 12 is inhibited from rotating in an angle larger than a constant angle under the condition that coercive force is stressed along the rotation direction when the lens is inserted.

The protruding parts 16*a* of the magnet yokes 16 have the function that the lens support 12 is inhibited from moving under the condition that the impact force acts to the upper part of the lens moving direction.

Particularly, under the condition of greater impact force, the possibility that the garbage is generated due to collision of the magnet yokes 16 and the lens support 12 exists, but the garbage can be scattered outside from the opening parts of the magnet yokes 16 even if the garbage is generated at the part.

Thus, the movement of the lens support 12 caused by the impact force during falling is blocked, so that the springs for maintaining the lens support 12 at the fixed part can be prevented from being deformed or broken.

Embodiment X

According to the lens driving device 10 in the tenth embodiment based on the components in the first embodiment to the eighth embodiment, the height of the fixed member 13 between the substrate surface 13*t* of the substrate 13*a* and the second front end face 22*b* of the protruding parts 22 (the second front end face of the protruding parts 22A) is set to be greater than the height of the first spring member 14 for being fixed to the fixed side on the substrate surface 13*t* of the substrate 13*a*.

According to the tenth embodiment, the height between the substrate surface 13*t* of the substrate 13*a* of the fixed member 13 for one end of the first spring member 14 to be fixed and the substrate surface of the flange part 19 of the lens support 12 for the other end of the first spring member 14 to be fixed (the lower surface in FIG. 1A and FIG. 2) becomes longer, and the spring recovery force of the first spring member 14 for pulling the lens support 12 towards the side of the fixed member 13 can be improved, so that the lens support 12 can be inhibited from floating from the fixed member 13. Therefore, the lens support 12 can be inhibited from falling due to gravity even if the lens support 12 is at the posture on the lower side of the fixed member 13, and the interval between the flange part 19 of the lens support 12 and the second front end face 22*b* of the protruding parts 22 of the fixed member 13 can be minimum, so that the garbage can be inhibited from invading into the photosensitive sensor 24.

Moreover, the fixed member 13 can also be integrally formed by the substrate 13*a*, the cylindrical dividing wall 21 and the protruding parts 22, or can also be formed by one or more than one component of the substrate 13*a*, the cylindrical dividing wall 21 and the protruding parts 22 in a split manner and then combined.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
   a lens support for retaining a lens, an end, close to an object to be shot, of the lens being defined as an inlet end, and the other end, far away from the object to be shot, of the lens being defined as an outlet end;
   a fixed member configured on one side of the outlet end of the lens and defining a circular through hole opposite to the outlet end of the lens such that a photosensitive sensor may be provided and being disposed oppositely the outlet end of the lens through the circular through hole;
   at least one spring member configured for connecting the lens support and the fixed member; and
   an electromagnetic driving assembly, comprising a coil winding around the lens support, and magnets and magnet yokes which are arranged opposite the coil with an interval; when current flowing into the coil, the lens retained on the lens support moving along an winding shaft direction of the coil and capable of focusing on the photosensitive sensor;
   wherein the fixed member comprises:
   a substrate, the circular through hole being formed in the substrate, and a diameter of the circular through hole being greater than or equal to an maximum caliber size of the lens;
   a cylindrical dividing wall extending from an edge defining the circular through holt towards the lens support;
   a plurality of protruding parts protruding from a substrate surface of the substrate on an outer peripheral side of the dividing wall towards the lens support; a surface, facing the lens support, of the plurality of protruding parts being defined as a second front end face; and
a plurality of concave parts formed between the second front end faces of the plurality of protruding parts and an outer peripheral surface of the dividing wall;
wherein the lens support comprises:
an end face, opposite to the fixed member, contacting with the second front end faces of the plurality of protruding parts, and opposite to the plurality of concave parts;
a cylindrical inner peripheral surface, extended from the end face, and arranged opposite to the outer peripheral surface of the dividing wall; and
a ring-shaped end surface, extended from the cylindrical inner peripheral surface, and arranged opposite to an end face of the dividing wall;
wherein the substrate surface of the substrate is taken as reference, a height of the dividing wall is greater than a height between the second front end face of the protruding part and the substrate surface of the substrate;
wherein the plurality of protruding parts are arranged at intervals around the circular though hole, or the plurality of protruding parts are continuously arranged around the circular through hole.

2. The lens driving device according to claim 1, wherein an overlapping amount between the end face of the cylindrical dividing wall and the end face of the lens support in a lens moving direction when the end face of the lens support contacts with the second front end faces of the plurality of protruding parts is greater than or equal to a maximum movement amount of the lens support in the lens moving direction, and a width of the concave part along a diameter direction of the lens is greater than or equal to one half of the height between the second front end face of the protruding part and the substrate surface of the substrate.

3. The lens driving device according to claim 1, wherein the lens support further comprises a cylindrical dividing wall extending from the end face of the lens support towards the plurality of concave parts and is positioned inside the plurality of concave parts when the end face of the lens support contacts with the second front end faces.

4. The lens driving device according to claim 3, wherein a circular ring-shaped groove is formed concavely in the end face of the dividing wall and sunken towards the substrate; the lens support comprises a corresponding cylindrical wall which is capable of inserting in the circular ring-shaped groove.

5. The lens driving device according to claim 3, wherein an annular groove concave from the outer peripheral surface of the dividing wall towards an inner peripheral surface of the dividing wall is formed in the outer periphery surface of the cylindrical dividing wall of the fixed member and surrounds the inner peripheral surface of the dividing wall.

6. The lens driving device according to claim 3, wherein a plurality of annular grooves with different diameters using a center shaft of the dividing wall as a center are formed in the end face of the dividing wall; a plurality of cylindrical dividing wall which are capable of inserting in the plurality of annular grooves respectively extend from the end face of the lens support.

7. A lens driving device, comprising:
a lens support for retaining a lens, an end, close to an object to be shot, of the lens being defined as an inlet end, and the other end, far away from the object to be shot, of the lens being defined as an outlet end;
a fixed member configured on one side of the outlet end of the lens and defining a circular through hole opposite to the outlet end of the lens such that a photosensitive sensor may be provided and being disposed oppositely the outlet end of the lens through the circular through hole;
at least one spring member configured for connecting the lens support and the fixed member; and
an electromagnetic driving assembly, comprising a coil winding around the lens support, and magnets and magnet yokes which are arranged opposite the coil with an interval; when current flowing into the coil, the lens retained on the lens support moving along an winding shaft direction of the coil and capable of focusing on the photosensitive sensor;
wherein the fixed member comprises:
a substrate, the circular through hole being formed in the substrate, and a diameter of the circular through hole being greater than or equal to an maximum caliber size of the lens;
a circular ring-shaped groove formed in the substrate around the circular through hole; and
a plurality of protruding parts protruding from a substrate surface of the substrate on an outer peripheral side of the circular ring-shaped groove towards the lens support; a surface, facing the lens support, of the plurality of protruding parts being defined a the second front end face;
wherein an end part, arranged opposite to the fixed member, of the lens support comprises:
an outer peripheral end face, configured for contacting with the second front end faces of the plurality of protruding parts;
a cylindrical side surface, extending from the outer peripheral end face towards the substrate;
an inner peripheral end face, extending from the cylindrical side surface to be in contact with the substrate; and
a cylindrical dividing wall, protruding from the inner peripheral end face towards the fixed member, and configured in the circular ring-shaped groove;
wherein the plurality of protruding parts are arranged at intervals around the circular through hole or continuously arranged around the circular through hole.

8. The lens driving device according to claim 7, wherein an overlapping amount between the circular ring-shaped groove and the cylindrical dividing wall is greater than or equal to a maximum movement amount of the lens support along a lens moving direction; and an interval greater than or equal to one half of a protruding height of the protruding parts is arranged between the protruding parts and the cylindrical dividing wall.

9. The lens driving device according to claim 7, wherein a convex part protruding towards an outer side of the dividing wall in a diameter direction is arranged on an outer peripheral surface of the dividing wall, and a limiting part for clamping the convex part in the peripheral direction of the dividing wall is arranged on the end face of the lens support.

10. The lens driving device according to claim 7, wherein a protruding part is arranged on the magnet yoke, and a concave part embedded with the protruding part is formed in the lens support.

11. The lens driving device according to claim 10, wherein there are two spring members:
a first spring member configured for connecting an end of the lens support close to the outlet end of the lens with the fixed member; and a second spring member configured for connecting the other end of the lens support close to the inlet end of the lens with the fixed members;

wherein a height between the second front end face of the protruding part and the substrate surface of the substrate is greater than a height of a fixing point where the first spring member is fixed to the substrate.

* * * * *